US009069307B2

(12) United States Patent
Ruiz et al.

(10) Patent No.: US 9,069,307 B2
(45) Date of Patent: Jun. 30, 2015

(54) FUSER SYSTEM FOR CONTROLLING STATIC DISCHARGE

(75) Inventors: Erwin Ruiz, Rochester, NY (US); William H. Wayman, Ontario, NY (US); Melissa A. Monahan, Rochester, NY (US); Robert W. Phelps, Victor, NY (US); Harry A. Hilbert, Fairport, NY (US); Steven M. Russel, Bloomfield, NY (US); David C. Irving, Avon, NY (US)

(73) Assignee: Xerox Corporation, Norwalk, CT (US)

( * ) Notice: Subject to any disclaimer, the term of this patent is extended or adjusted under 35 U.S.C. 154(b) by 272 days.

(21) Appl. No.: 13/546,717

(22) Filed: Jul. 11, 2012

(65) Prior Publication Data

US 2014/0016974 A1 Jan. 16, 2014

(51) Int. Cl.
*G03G 15/20* (2006.01)

(52) U.S. Cl.
CPC .................................. *G03G 15/2057* (2013.01)

(58) Field of Classification Search
CPC .................................................. G03G 15/2057
USPC .......................................................... 399/333
See application file for complete search history.

(56) References Cited

U.S. PATENT DOCUMENTS 6,743,561 B2 6/2004 Heeks et al.
7,608,325 B2 10/2009 Rasch et al.
2002/0197089 A1* 12/2002 Satoh ............................ 399/333
2011/0142508 A1* 6/2011 Qi et al. ........................ 399/333
2011/0217529 A1 9/2011 Qi et al.

FOREIGN PATENT DOCUMENTS

JP 57074768 A * 5/1982
JP 2001175107 A * 6/2001

* cited by examiner

*Primary Examiner* — Quana M Grainger
(74) *Attorney, Agent, or Firm* — Hoffman Warnick LLC

(57) ABSTRACT

The present teachings provide a fuser system for use in a xerographic apparatus. The fuser system includes a fuser roller and a pressure roller. The fuser roller and the pressure roller create a nip. The fuser roller has an outer layer of carbon nanotubes dispersed in a fluoropolymer wherein the carbon nanotubes comprise from about 0.1 weight percent to about 10 weight percent of the outer layer. The pressure roller comprises a static dissipative outer surface having a surface resistivity of less than about $10^{10}$ Ω/cm.

19 Claims, 7 Drawing Sheets

FUSER SYSTEM FOR CONTROLLING STATIC DISCHARGE

BACKGROUND

1. Field of Use

This disclosure is generally directed to fuser systems useful in electrostatographic imaging apparatuses, including digital, image on image, and the like.

2. Background

During fusing, the interaction between the fuser roll and the pressure roll can create an electrostatic charge signature at the nip.

In addition, triboelectric charge is generated when two surfaces of dissimilar materials rub against each other. Triboelectric charging is dependent on many factors including the polarities of the surfaces in relation to each other, the roughness of the surfaces, the adhesion between the surfaces and the ability of the surfaces to hold onto free electrons. When a copy substrate is passed through a fuser nip, triboelectric charging occurs.

Since toner particles prior to fusing are held in place through electrostatic forces, electrostatic charge and triboelectric charge can disturb the toner particles on the substrate passing through the nip. When such disturbance of the toner particles occurs, the quality of resulting fused image suffers.

As production speed of electrostatographic machines increases, the problems of electrostatic charge and triboelectric charge are exacerbated. It would be desirable to minimize electrostatic and triboelectric charge issues without negatively impacting the speed of the imaging apparatus.

SUMMARY

According to an embodiment, there is provided a fuser system comprising a fuser roller comprising an outer layer comprising carbon nanotubes dispersed in a fluoropolymer wherein the carbon nanotubes comprise from about 0.1 weight percent to about 10 weight percent of the outer layer. There is a pressure roller. The fuser roller and the pressure roller create a nip. The pressure roller comprises a static dissipative outer surface having a surface resistivity of less than about $10^{10}$ Ω/cm.

According to another embodiment, there is provided an image forming apparatus for forming images on a recording medium. The apparatus comprises a charge-retentive surface to receive an electrostatic latent image thereon, a development component to apply toner to the charge-retentive surface to develop the electrostatic latent image to form a developed image on the charge-retentive surface and a transfer component to transfer the developed image from the charge retentive surface to a copy substrate. The apparatus includes a fuser system for fusing toner images to a surface of the copy substrate. The fuser system includes a fuser roller comprising an outer layer comprising carbon nanotubes dispersed in a fluoropolymer and a pressure roller comprising a static dissipative outer surface. The static dissipative outer surface has a surface resistivity of less than about $10^{10}$ Ω/cm. The fuser roller and the pressure roller create a nip through which the copy substrate passes.

According to another embodiment, there is described a fuser system comprising a fuser roller comprising a release layer comprising carbon nanotubes dispersed in a fluoropolymer wherein the carbon nanotubes comprise from about 0.1 weight percent to about 10 weight percent of the outer layer. The fuser system include an oil delivery roller for delivering oil to the release layer of the fuser roller, wherein the delivery roller comprises a static dissipative outer surface having a surface resistivity of less than about $10^6$ Ω/cm. The fuser system includes a pressure roller wherein the fuser roller and the pressure roller create a nip, the pressure roller comprising a static dissipative outer surface having a surface resistivity of less than about $10^6$ Ω/cm.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

It should be noted that some details of the FIGS. have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Furthermore, to the extent that the terms "including", "includes", "having", "has", "with", or variants thereof are used in either the detailed description and the claims, such terms are intended to be inclusive in a manner similar to the term “comprising.” The term “at least one of” is used to mean that one or more of the listed items can be selected.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of “less than 10” can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as “less than 10” can assume negative values, e.g. −1, −2, −3, −10, −20, −30, etc.

Figure 1:
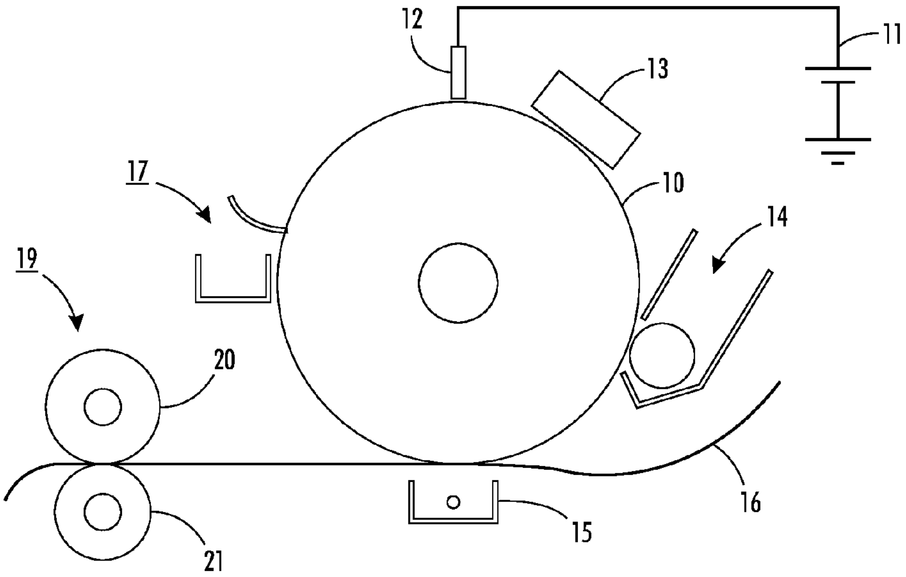
FIG. 1 is a schematic illustration of an image apparatus.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles, which are commonly referred to as toner. Specifically, a photoreceptor 10 is charged on its surface by means of a charger 12 to which a voltage has been supplied from a power supply 11. The photoreceptor 10 is then imagewise exposed to light from an optical system or an image input apparatus 13, such as a laser or light emitting diode, to form an electrostatic latent image thereon. Generally, the electrostatic latent image is developed by bringing a developer mixture from a developer station 14 into contact therewith. Development can be effected by use of a magnetic brush, powder cloud, or other known development process. A dry developer mixture usually comprises carrier granules having toner particles adhering triboelectrically thereto. Toner particles are attracted from the carrier granules to the latent image, forming a toner powder image thereon. Alternatively, a liquid developer material may be employed, which includes a liquid carrier having toner particles dispersed therein. The liquid developer material is advanced into contact with the electrostatic latent image and the toner particles are deposited thereon in image configuration.

After the toner particles have been deposited on the photoconductive surface in image configuration, they are transferred to a copy sheet 16 by a transfer means 15, which can be pressure transfer or electrostatic transfer. Alternatively, the developed image can be transferred to an intermediate transfer member, or bias transfer member, and subsequently transferred to a copy sheet. Examples of copy substrates include paper, transparency material such as polyester, polycarbonate, or the like, cloth, wood, or any other desired material upon which the finished image will be situated.

After the transfer of the developed image is completed, copy sheet 16 advances to a fusing station 19, depicted in FIG. 1 as a fuser roller 20 and a pressure roller 21, wherein the developed image is fused to copy sheet 16 by passing copy sheet 16 between the fusing and pressure members, thereby forming a permanent image.

Photoreceptor 10, subsequent to transfer, advances to cleaning station 17, wherein any toner left on photoreceptor 10 is cleaned therefrom by use of a blade (as shown in FIG. 1), brush, or other cleaning apparatus.

With the advancement in material technology, carbon nanotubes have replaced carbon black as electrically conductive filler in fuser rollers. The commercial acceptance of carbon nanotubes in fuser outer layers provide many advantages. Carbon nanotubes require less loading in the outer layer to achieve the desired thermal conductivity at the fuser surface. The predictability of carbon nanotube performance is better than with carbon black. However, carbon nanotubes are much more electrically conductive than carbon black at loadings achieving equal thermal conductivity. With the increase in processing speed of electrostatographic devices and the use of carbon nanotubes in the fuser roller, image quality of the fused or fixed image has been degraded.

Figure 2:
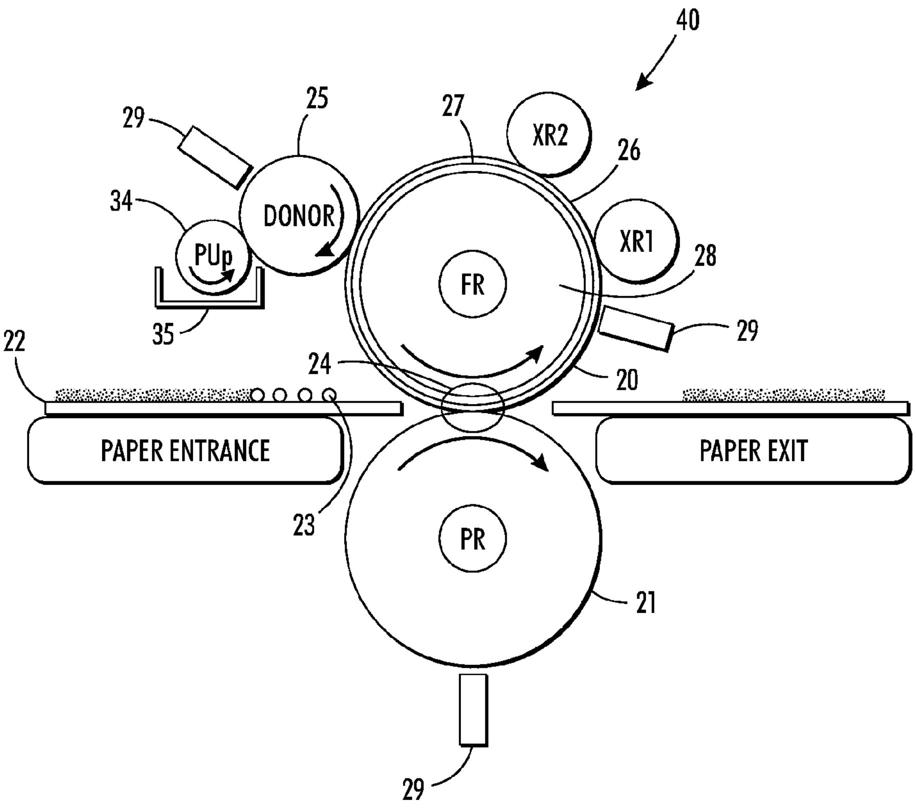
FIG. 2 is a schematic of an embodiment of a fuser system.

FIG. 2 is a schematic of a fuser system 40. The fuser system 40 includes a fuser roller 20 and a pressure roller 21. A substrate 22 having toner particles 23 adhering to the substrate 22 through electrostatic forces is passed through the nip 24. Pressure and heat at the nip 24 are used to fuse or affix the toner particles 23 to the substrate 22. Shown in FIG. 2 is a donor roller 25 that applies a thin layer of oil to the fuser roller 20. The donor roll 25 is supplied oil through supply container 35 and supply roller 34. In embodiments, the fuser roller 20 has three or more layers. An outer layer or release layer 26, an intermediate layer or cushioning layer 27 and a substrate layer 28. In FIG. 2, electrostatic voltage meters 29 are shown and are used to measure the surface voltage at various places in the fuser system. Optional heating rolls labeled XR1 and XR2 are shown and used to heat the outer surface of the fuser roller 20. Heaters may be installed internally in the pressure roller 21 or fuser roller 20. Other methods of supplying heat at the nip 24 include radiant heaters. An infrared sensor (not shown) determines when a substrate 22 or paper passes through the nip 24.

During fusing, it was discovered that the interaction between a fuser roller 20 containing carbon nanotubes (CNT) dispersed in a fluoropolymer as the release layer 26 and the pressure roll 21 creates an electrostatic charge signature at the nip 24. This electrostatic charge travels on the pressure roll 21 surface and induces a periodic electrostatic discharge that disturbs the toner particles 23 on the substrate 22 prior to fusing. This disturbance manifests itself as a defect in the fused image on the substrate 22. Specifically, a phenomenon identified as image quality (IQ) banding on halftone images appears on the fused image on substrate 22.

Use of carbon nanotubes dispersed in a fluoropolymer as the outer surface of a fuser roll provides certain advantages. Carbon nanotubes allow fusing at higher speeds for example, from about 120 pages per minutes (ppm) to about 135 ppm. Carbon nanotubes are electrical conductive. The electrical conductivity of the carbon nanotubes contributes to the generation of the electrical static charges on the roll surface and at the nip. IQ banding is caused by this electrostatic build up, which disturbs the loose charged toner as it approaches fuser nip 24.

By providing a pressure roller 21 that has a static dissipative outer surface with the CNT fuser roller, IQ banding on the substrate is eliminated. By pairing the CNT fuser roller 20 with a pressure roller 21 having a static dissipative outer surface, electrostatic disturbance of toner particle is eliminated. By eliminating the electrostatic charges, IQ half tone banding is eliminated and overall image quality is improved as the toner particles are not disturbed. The combination of a CNT fuser roller and a pressure roll having a static dissipative outer surface provides an electrostatic free nip preventing disturbance of toner particles prior to fusing.

In embodiments, a donor roller 25 that has a static dissipative outer surface further reduces static charge in the fuser system. By pairing the CNT fuser roller 20 with a pressure roller 21 having a static dissipative outer surface, further reduction in static charge and toner particle disturbance is possible. The combination of a CNT fuser roller, a pressure roll having a static dissipative outer surface and a donor roller having a static dissipative outer surface provides an electrostatic free nip preventing disturbance of toner particles prior to fusing.

The fuser system disclosed herein is described below. The fuser system includes a fuser roller 20 and a pressure roller 21. The fuser roller 20 and pressure roller 21 create a nip 24 through which a substrate 22 is passed and the toner particles 23 are thereby fixed to the substrate through a combination of heat and pressure.

Fuser System

Fuser Roller

Substrate Layer

The substrate 28 of fuser roller 20 in FIG. 2 is in the form of a cylindrical drum or roller. The substrate 28 is not limited, as long as it can provide high strength and physical properties that do not degrade at a fusing temperature. Specifically, the substrate can be made from a metal, such as aluminum, nickel or stainless steel or a plastic of a heat-resistant resin. Examples of the heat-resistant resin include a polyimide, an aromatic polyimide, polyether imide, polyphthalamide, polyester and the like. The thickness of the substrate 28 is from about 10 micrometers to about 200 micrometers or from about 30 micrometers to about 100 micrometers. Interior to the substrate 28 a heating unit (not shown) can be provided.

Intermediate Layer

Examples of materials used for the intermediate layer 27 of fuser roller 20 include fluorosilicones, silicone rubbers such as room temperature vulcanization (RTV) silicone rubbers, high temperature vulcanization (HTV) silicone rubbers, and low temperature vulcanization (LTV) silicone rubbers. These rubbers are known and readily available commercially, such as SILASTIC® 735 black RTV and SILASTIC® 732 RTV, both from Dow Corning; 106 RTV Silicone Rubber and 90 RTV Silicone Rubber, both from General Electric; and JCR6115CLEAR HTV and SE4705U HTV silicone rubbers from Dow Corning Toray Silicones. Other suitable silicone materials include siloxanes (such as polydimethylsiloxanes); fluorosilicones such as Silicone Rubber 552, available from Sampson Coatings, Richmond, Va.; liquid silicone rubbers such as vinyl crosslinked heat curable rubbers or silanol room temperature crosslinked materials; and the like. Another specific example is Dow Corning Sylgard 182. Commercially available LSR rubbers include Dow Corning Q3-6395, Q3-6396, SILASTIC® 590 LSR, SILASTIC® 591 LSR, SILASTIC® 595 LSR, SILASTIC® 596 LSR, and SILASTIC® 598 LSR from Dow Corning. The functional layers provide elasticity and can be mixed with inorganic particles, for example SiC or $Al_2O_3$, as required.

Other examples of the materials suitable for use as functional intermediate layer 27 also include fluoroelastomers. Fluoroelastomers are from the class of 1) copolymers of two of vinylidenefluoride, hexafluoropropylene, and tetrafluoroethylene; 2) terpolymers of vinylidenefluoride, hexafluoropropylene, and tetrafluoroethylene; and 3) tetrapolymers of vinylidenefluoride, hexafluoropropylene, tetrafluoroethylene, and a cure site monomer. These fluoroelastomers are known commercially under various designations such as VITON A®, VITON B® VITON E® VITON E 60C®, VITON E430®, VITON 910®, VITON GH®; VITON GF®; and VITON ETP®. The VITON® designation is a trademark of E.I. DuPont de Nemours, Inc. The cure site monomer can be 4-bromoperfluorobutene-1,1,1-dihydro-4-bromoperfluorobutene-1,3-bromoperfluoropropene-1,1,1-dihydro-3-bromoperfluoropropene-1, or any other suitable, known cure site monomer, such as those commercially available from DuPont. Other commercially available fluoropolymers include FLUOREL 2170®, FLUOREL 2174®, FLUOREL 2176®, FLUOREL 2177® and FLUOREL LVS 76®, FLUOREL® being a registered trademark of 3M Company. Additional commercially available materials include AFLAS™ a poly(propylene-tetrafluoroethylene), and FLUOREL II® (LII900) a poly(propylene-tetrafluoroethylenevinylidenefluoride), both also available from 3M Company, as well as the Tecnoflons identified as FOR-60KIR®, FOR-LHF®, NM®, FOR-THF®, FOR-TFS®, TH®, NH®, P757®, TNS®, T439®, PL958®, BR9151® and TN505®, available from Ausimont.

Examples of three known fluoroelastomers are (1) a class of copolymers of two of vinylidenefluoride, hexafluoropropylene, and tetrafluoroethylene, such as those known commercially as VITON A®; (2) a class of terpolymers of vinylidenefluoride, hexafluoropropylene, and tetrafluoroethylene known commercially as VITON B®; and (3) a class of tetrapolymers of vinylidenefluoride, hexafluoropropylene, tetrafluoroethylene, and cure site monomer known commercially as VITON GH® or VITON GF®.

The fluoroelastomers VITON GH® and VITON GF® have relatively low amounts of vinylidenefluoride. The VITON GF® and VITON GH® have about 35 weight percent of vinylidenefluoride, about 34 weight percent of hexafluoropropylene, and about 29 weight percent of tetrafluoroethylene, with about 2 weight percent cure site monomer.

The thickness of the intermediate layer 27 is from about 30 microns to about 1,000 microns, or from about 100 microns to about 800 microns, or from about 150 to about 500 microns.

Release Layer

The release layer 26 of fuser roller 20 includes a fluoropolymer having carbon nanotubes dispersed therein. Fluoropolymers suitable for use in the formulation described herein include both fluoroelastomers and fluoroplastics. The fluoropolymers comprise a monomeric repeat unit that is selected from the group consisting of vinylidene fluoride, hexafluoropropylene, tetrafluoroethylene, perfluoroalkylvinylether, and mixtures thereof. The fluoropolymers may include linear or branched polymers, and cross-linked fluoroelastomers. Examples of fluoropolymer include polytetrafluoroethylene (PTFE); perfluoroalkoxy polymer resin (PFA); copolymers of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), hexafluoropropylene (HFP), and a cure site monomer and mixtures thereof. The fluoropolymers have a melting or curing temperature of from about 255° C. to about 360° C. or from about 280° C. to about 330° C.

Fluoroelastomers can be used as the fluoropolymer for the release layer 26 of fuser roller 20 and are from the class of 1) copolymers of two of vinylidenefluoride, hexafluoropropylene, and tetrafluoroethylene; 2) terpolymers of vinylidenefluoride, hexafluoropropylene, and tetrafluoroethylene; and 3) tetrapolymers of vinylidenefluoride, hexafluoropropylene, tetrafluoroethylene, and a cure site monomer. These fluoroelastomers are known commercially under various designations such as VITON A®, VITON B®, VITON E®, VITON E 60C®, VITON E430®, VITON 910®, VITON GH®; VITON GF®; and VITON ETP®. The VITON® designation is a trademark of E.I. DuPont de Nemours, Inc. The cure site monomer can be 4-bromoperfluorobutene-1,1,1-dihydro-4-bromoperfluorobutene-1,3-bromoperfluoropropene-1,1,1-dihydro-3-bromoperfluoropropene-1, or any other suitable, known cure site monomer, such as those commercially available from DuPont. Other commercially available fluoropolymers include FLUOREL 2170®, FLUOREL 2174®, FLUOREL 2176®, FLUOREL 2177® and FLUOREL LVS 76®, FLUOREL® being a registered trademark of 3M Company. Additional commercially available materials include AFLAS™ a poly(propylene-tetrafluoroethylene), and FLUOREL II® (LII900) a poly(propylene-tetrafluoroethylenevinylidenefluoride), both also available from 3M Company, as well as the Tecnoflons identified as FOR-60KIR®, FOR-LHF®, NM® FOR-THF®, FOR-TFS®, TH®, NH®, P757®, TNS®, T439®, PL958®, BR9151® and TN505®, available from Ausimont.

Carbon nanotubes are present in an amount of from about 0.1 weight percent to about 10 weight percent or from about 0.5 weight percent to about 5 weight percent, or from about 1 weight percent to about 4 weight percent based on the total weight of the carbon nanotubes and fluoropolymer particles in the release layer 26.

As used herein and unless otherwise specified, the term "carbon nanotube" or CNT refers to an elongated carbon material that has at least one minor dimension; for example, width or diameter of up to 100 nanometers. In various embodiments, the CNTs can have an average diameter ranging from about 1 nm to about 100 nm, or in some cases, from about 10 nm to about 50 nm, or from about 10 nm to about 30 nm. The CNTs have an aspect ratio of at least 10, or from about 10 to about 1000, or from about 10 to about 100. The aspect ratio is defined as the length to diameter ratio.

In various embodiments, the carbon nanotubes can include, but are not limited to, carbon nanoshafts, carbon nanopillars, carbon nanowires, carbon nanorods, and carbon nanoneedles and their various functionalized and derivatized fibril forms, which include carbon nanofibers with exemplary forms of thread, yarn, fabrics, etc. In one embodiment, the CNTs can be considered as one atom thick layers of graphite, called graphene sheets, rolled up into nanometer-sized cylinders, tubes, or other shapes.

In various embodiments, the carbon nanotubes or CNTs can include single wall carbon nanotubes (SWCNTs), multiwall carbon nanotubes (MWCNTs), and their various functionalized and derivatized fibril forms such as carbon nanofibers.

The CNTs can be formed of conductive or semi-conductive materials. In some embodiments, the CNTs can be obtained in low and/or high purity dried paper forms or can be purchased in various solutions. In other embodiments, the CNTs can be available in the as-processed unpurified condition, where a purification process can be subsequently carried out.

Additives and additional conductive or non-conductive fillers may be present in the intermediate layer 27 or outer surface layer 26. In various embodiments, other filler materials or additives including, for example, carbon blacks such as carbon black, graphite, fullerene, acetylene black, fluorinated carbon black, and the like; metal oxides and doped metal oxides, such as tin oxide, antimony dioxide, antimony-doped tin oxide, titanium dioxide, indium oxide, zinc oxide, indium oxide, indium-doped tin trioxide, and the like; and mixtures thereof. Certain polymers such as polyanilines, polythiophenes, polyacetylene, poly(p-phenylene vinylene), poly(p-phenylene sulfide), pyrroles, polyindole, polypyrene, polycarbazole, polyazulene, polyazepine, poly(fluorine), polynaphthalene, salts of organic sulfonic acid, esters of phosphoric acid, esters of fatty acids, ammonium or phosphonium salts and mixtures thereof can be used as conductive fillers. In various embodiments, other additives known to one of ordinary skill in the art can also be included to form the disclosed composite materials.

For the fuser roller 20, the thickness of the release layer 26 or outer layer can be from about 10 microns to about 100 microns, or from about 20 microns to about 80 microns, or from about 40 microns to about 60 microns.

Adhesive Layer(s)

Optionally, any known and available suitable adhesive layer, also referred to as a primer layer, may be positioned between the outer surface layer 26, the intermediate layer 27 and the substrate 28. Examples of suitable adhesives include silanes such as amino silanes (such as, for example, HV Primer 10 from Dow Corning), titanates, zirconates, aluminates, and the like, and mixtures thereof. In an embodiment, an adhesive in from about 0.001 percent to about 10 percent solution can be wiped on the substrate. The adhesive layer can be coated on the substrate, or on the outer layer, to a thickness of from about 2 nanometers to about 2,000 nanometers, or from about 2 nanometers to about 500 nanometers. The adhesive can be coated by any suitable known technique, including spray coating or wiping.

Pressure Roller

The pressure roller 21 in FIG. 2 is in the form of a cylindrical drum or roller. The pressure roller 21 and fuser roller 20 create a nip. The pressure roller 21 has a static dissipative outer surface having a surface resistivity of less than about $10^{10}$ Ω/cm, or in embodiments less than about $10^{8}$ Ω/cm or less than about $10^{6}$ Ω/cm. The material used to provide the static dissipative outer surface includes metals such as aluminum, steel, stainless steel, nickel, copper, silver, gold, platinum, and plastics or polymers having electrically conductive particles dispersed in the polymer.

The static dissipative outer surface of the pressure roller 21 can be made electrically conductive by applying a layer of electrically conductive paint, such as silver paint, or providing a polymeric outer surface wherein the polymer has electrically conducting particles dispersed therein.

Oil Delivery Apparatus

In certain configuration fuser oil or release oil is delivered to the surface of the fuser roller 20 to ensure and maintain good release properties of the toner at the nip 24. The application of a release oil is provided by a roller 25 that is replenished with a release oil. The donor roller 25 applies release oil to the fuser roller outer surface during the fusing operation. Typically, these materials are applied as thin films of, for example, silicone oils, such as polydimethyl siloxane, or substituted silicone oils, such as amino-substituted oils, mercapto-substituted oils, or the like, to prevent toner offset. for example, in U.S. Pat. No. 6,743,561, the complete disclosure of which is incorporated herein by reference.

The delivery roller has a static dissipative outer surface having a surface resistivity of less than about $10^{10}$ Ω/cm, or in embodiments less than about $10^{8}$ Ω/cm or less than about $10^{6}$ Ω/cm. The material used to provide the static dissipative outer surface includes metals such as aluminum, steel, stainless steel, nickel, copper, silver, gold, platinum, and plastics or polymers having electrically conductive particles dispersed in the polymer.

Specific embodiments will now be described in detail. These examples are intended to be illustrative, and not limited to the materials, conditions, or process parameters set forth in these embodiments. All parts are percentages by solid weight unless otherwise indicated.

EXAMPLES

The schematic shown in FIG. 2 was used for the experiments described below. In all cases the fuser roller 20 had an outer layer or release layer 26 containing about 3 weight percent of carbon nanotubes dispersed in fluoroelastomer. The fluoroelastomer was VITON-GF® (E.I. du Pont de Nemours, Inc.), including TFE, HFP, and VF2, and a cure site monomer. The curing agent was VITON® Curative No. 50 (VC-50) available from E.I. du Pont de Nemours, Inc. Curative VC-50 contains Bisphenol-AF as a cross-linker and diphenylbenzylphosphonium chloride as an accelerator.

Initially the pressure roller 21 had an outer surface of perfluoroalkoxy resin (Pressure Roller 1). The pressure roller 21 had an insulating surface with a resistivity of greater than $10^{10}$ Ωcm. A Xerox iGen 4 machine was used to measure the electrostatic voltage at the locations of the sensors 29 shown in FIG. 2 during operation. The speed of the machine was 110 ppm using coated paper and toner. The resulting static charge measurements are shown in FIGS. 3 and 4.

Figure 3:
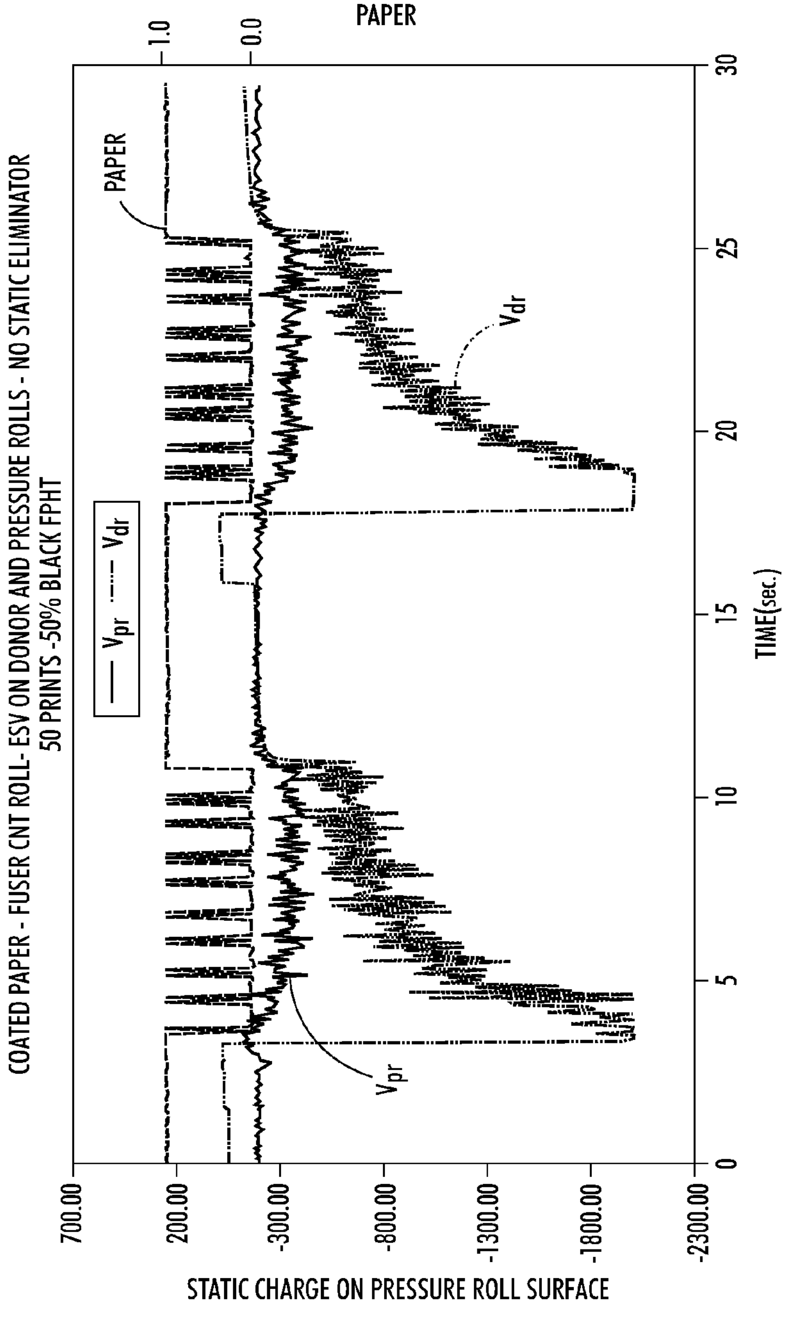
FIG. 3 shows electrostatic charge of a surface of the donor roller having a non static dissipative outer surface, a pressure roller having a non static dissipative outer surface and the paper signal.
Figure 4:
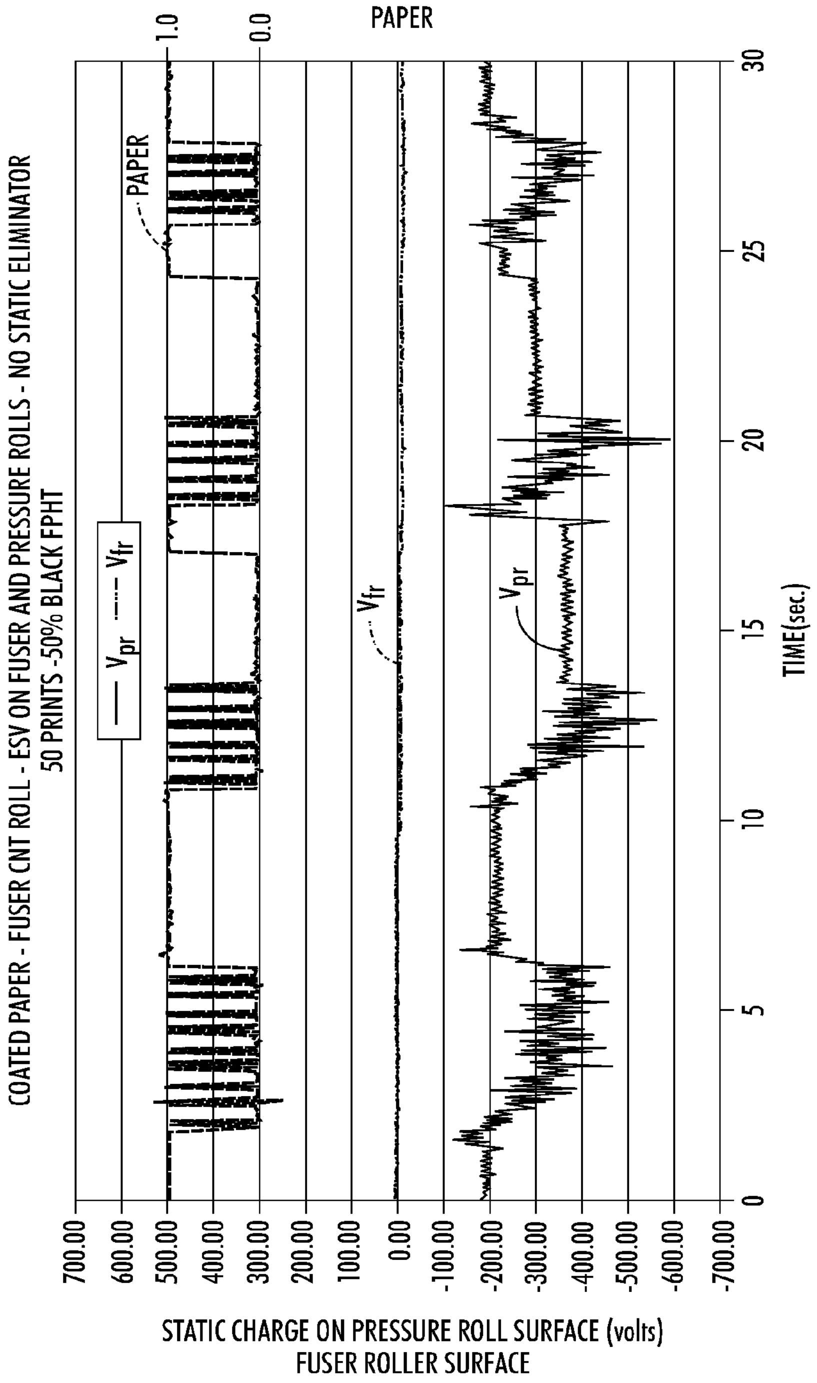
FIG. 4 shows electrostatic charge of the surface of a fuser roller containing carbon nanotubes dispersed in a fluoropolymer, a pressure roller having a non static dissipative outer surface and the paper signal.

FIG. 3 shows the electrostatic voltage on the donor and pressure rollers during operation. The donor roller 25 starts with a relatively high initial electrostatic charge that continually discharges during operation. The pressure roller electrostatic voltage, shown more clearly in FIG. 4 periodically rises and discharges while the fuser roller is not holding any charge. The paper is detected by a sensor and is shown in FIG. 3 as the paper. When at 1 the paper is in the nip 24 and when at 0 there is no paper in the nip 24. FIG. 3. shows a periodic cycling of the voltage on the surface of the pressure roller 21. FIG. 4 shows the electrostatic voltage of the pressure roller and fuser roller in the system. There is no surface voltage on the surface of the fuser roller, and the voltage cycles on the surface of the pressure roller.

Figure 5:
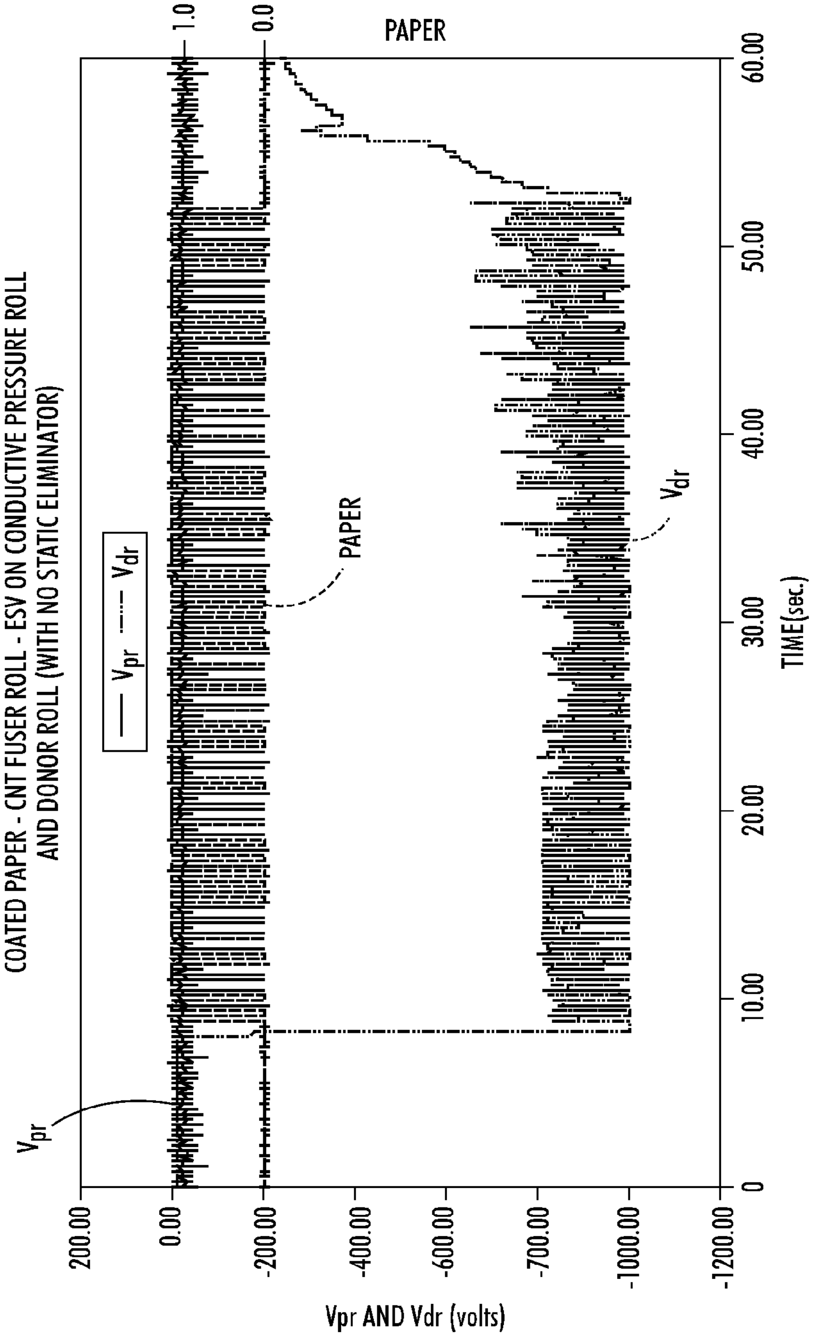
FIG. 5 shows electrostatic charge of the surface of a pressure roller having a static dissipative outer surface and a donor roller having a non-static dissipative outer surface and the paper signal.

The pressure roller was changed (Pressure Roller 2). The pressure roller 21 was provided with an electrically conducting surface. The surface of the pressure roller was perfluoroalkoxy resin having dispersed therein carbon fibers, carbon black and graphite at about 1 to about 10 weight percent based on the total weight of the surface coating. The conductivity of the surface of the pressure roller was less than about $10^6$ Ω/cm. FIG. 5 shows the pressure roller electrostatic charge close to zero, a donor roller having a non-static dissipative outer surface and a paper signal. There is no cycling of the electrostatic charge on the pressure roller surface, as was present with a non-electrically conducting pressure roller surface.

Figure 6:
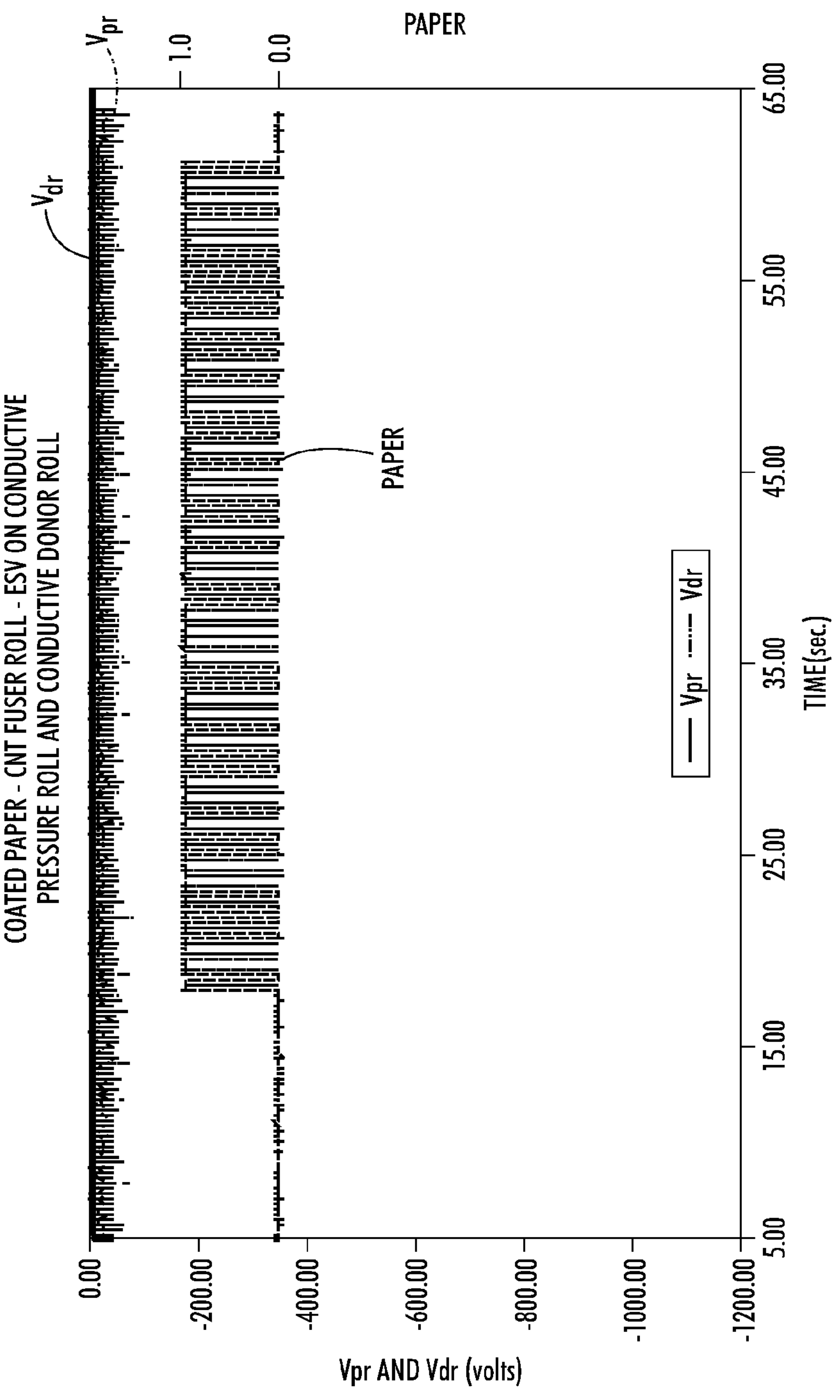
FIG. 6 shows electrostatic charge of a surface of the donor roller having a static dissipative outer surface, a pressure roller having a static dissipative outer surface and the paper signal.

Using Pressure Roller 2 and a donor roller having electrically conductive particles added to the surface to provide a surface conductivity of less than about $10^{10}$ Ω/cm, further trials were run. FIG. 6 shows the pressure roller electrostatic charge close to zero, the donor roller charge close to zero and the paper signal.

Figure 7:
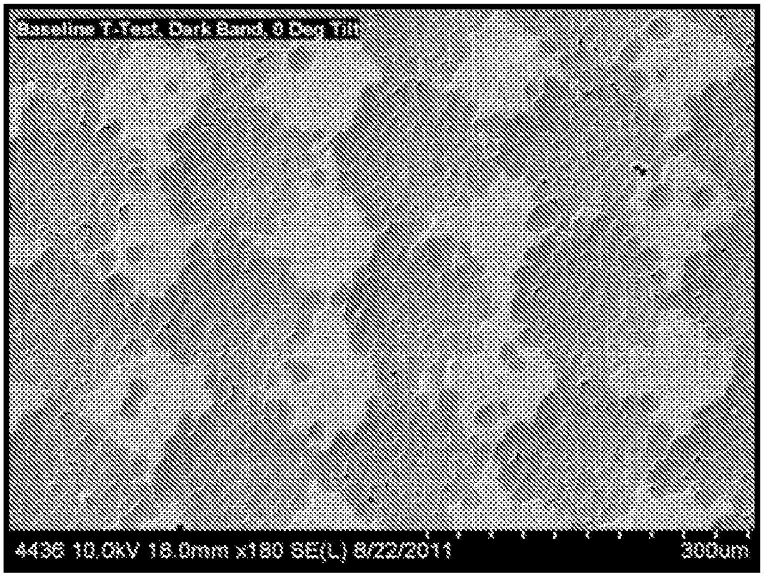
FIG. 7 shows halftone dot scanning electron microscope (SEM) images on coated paper obtained using a fuser system having a CNT fuser roller and a non-electrically conductive pressure roller.

Halftone dot scanning electron microscope (SEM) images were produced using this fuser system configuration as described in FIGS. 3 and 4 (a non-electrically conducting surface in the pressure roller) and an example is shown in FIG. 7. As can be seen in FIG. 7, the toner dots are disturbed due to electrostatic charges on the pressure roller.

Figure 8:
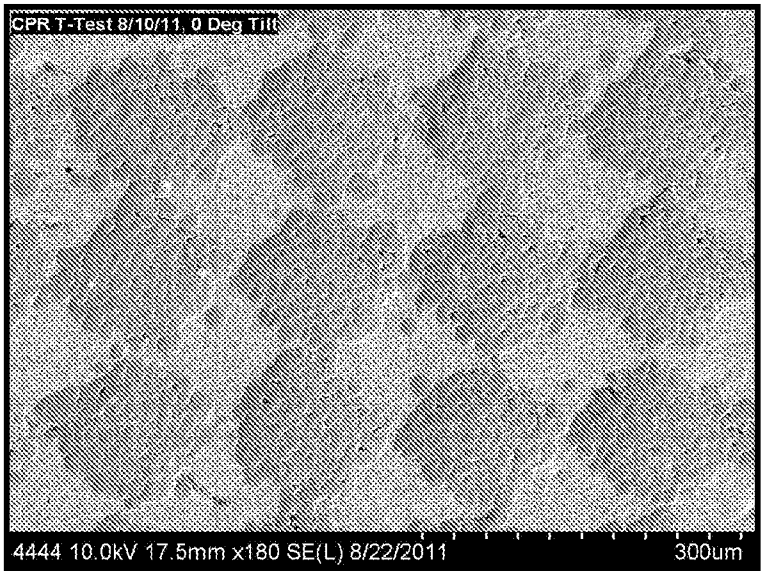
FIG. 8 shows halftone dot SEM images on coated paper obtained using a fuser system having a CNT fuser roller and an electrically conductive pressure roller.

In the second trial, the pressure roller 21 had an outer surface of perfluoroalkoxy resin having dispersed therein carbon fibers to make the outer surface electrically conductive as described in FIG. 5. The conductivity of the surface was less than about $10^6$ Ω/cm. Halftone dot scanning electron microscope (SEM) images were produced using this fuser system configuration and an example is shown in FIG. 8. As can be seen in FIG. 8, the toner dots are not disturbed and the image is clearer and sharper than the image in FIG. 7. When one looks at the spaces between the toner dots, FIG. 7 shows many more toner particles in these spaces. The disturbance of the toner causes unacceptable image quality.

An electrically conductive surface on the pressure roll eliminates buildup of static charge and periodic electrostatic discharge and IQ banding. The elimination of IQ banding enables the usage of the CNT roll technology at high production speeds (from about 110 ppm to 135 ppm).

Better toner dot stability provides a cleaner and sharper image. The elimination of static on the pressure and fuser rollers helps post-fusing paper transport, i.e. jams and corner folds.

It will be appreciated that variants of the above-disclosed and other features and functions or alternatives thereof may be combined into other different systems or applications. Various presently unforeseen or unanticipated alternatives, modifications, variations, or improvements therein may be subsequently made by those skilled in the art, which are also encompassed by the following claims.

What is claimed is:

1. A fuser system comprising:

a fuser roller comprising an outer layer comprising carbon nanotubes dispersed in a fluoropolymer wherein the carbon nanotubes comprise from about 0.1 weight percent to about 10 weight percent of the outer layer an oil delivery roller in contact with the outer layer of the fuser roller for delivering oil, wherein the oil delivery roller comprises a static dissipative outer surface having a surface resistivity of less than about $10^{10}$ Ω/cm; and a pressure roller wherein the fuser roller and the pressure roller create a nip, the pressure roller comprising a static dissipative outer surface having a surface resistivity of less than about $10^{10}$ Ω/cm.

2. The fuser system of claim 1, wherein the fluoropolymer of outer layer of the fuser roller comprises a fluoroelastomer selected from the group consisting of copolymers of two of vinylidenefluoride, hexafluoropropylene, and tetrafluoroethylene; terpolymers of vinylidenefluoride, hexafluoropropylene, and tetrafluoroethylene; and tetrapolymers of vinylidenefluoride, hexafluoropropylene, tetrafluoroethylene, and a cure site monomer.

3. The fuser system of claim 1, wherein the carbon nanotubes comprise from about 0.5 weight percent to about 5 weight percent of the outer layer.

4. The fuser system of claim 1, wherein the static dissipative outer surface of the pressure roller has a surface resistivity of less than about $10^8$ Ω/cm.

5. The fuser system of claim 1, wherein the static dissipative outer surface of the pressure roller has a surface resistivity of less than about $10^6$ Ω/cm.

6. The fuser system of claim 1, wherein the static dissipative outer surface of the pressure roller comprises conductive particles dispersed in a fluoropolymer.

7. The fuser system of claim 6, wherein the fluoropolymer of the static dissipative outer surface of the pressure roller comprises a fluoroplastic selected from the group consisting of polytetrafluoroethylene (PTFE); perfluoroalkoxy polymer resin (PFA); copolymer of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), and hexafluoropropylene (HFP).

8. The fuser system of claim 6, wherein the static dissipative outer surface of the pressure roller comprises a metal selected from the group consisting of silver, aluminum and nickel.

9. The fuser system of claim 1, wherein the fuser roller further comprises:

a substrate; and a resilient layer disposed on the substrate wherein the outer layer is disposed on the resilient layer.

10. An image forming apparatus for forming images on a recording medium comprising a charge-retentive surface to receive an electrostatic latent image thereon; a development component to apply toner particles to the charge-retentive surface to develop the electrostatic latent image to form a developed image on the charge-retentive surface; a transfer component to transfer the developed image from the charge retentive surface to a copy substrate; and a fuser system for fusing toner particles to the copy substrate, wherein said fuser system comprises:

a fuser roller comprising a release layer comprising carbon nanotubes dispersed in a fluoropolymer wherein the carbon nanotubes comprise from about 0.1 weight percent to about 10 weight percent of the release layer;

an oil delivery roller in contact with the release layer of the fuser roller for delivering oil, wherein the oil delivery roller comprises a static dissipative outer surface having a surface resistivity of less than about $10^{10}$ Ω/cm; and a pressure roller comprising a static dissipative outer surface having a surface resistivity of less than about $10^{10}$ Ω/cm wherein the fuser roller and the pressure roller create a nip through which the copy substrate passes.

11. The image forming apparatus of claim 10, wherein the static dissipative outer surface of the pressure roller has a surface resistivity of less than about $10^6$ Ω/cm.

12. The image forming apparatus of claim 10, wherein the static dissipative outer surface of the delivery roller has a surface resistivity of less than about $10^6$ Ω/cm.

13. The image forming apparatus of claim 10, wherein the fluoropolymer of outer layer of the fuser roller comprises a fluoroelastomer selected from the group consisting of copolymers of two of vinylidenefluoride, hexafluoropropylene, and tetrafluoroethylene; terpolymers of vinylidenefluoride, hexafluoropropylene, and tetrafluoroethylene; and tetrapolymers of vinylidenefluoride, hexafluoropropylene, tetrafluoroethylene, and a cure site monomer.

14. The image forming apparatus of claim 10, wherein the carbon nanotubes of the outer layer of the fuser roller comprise from about 0.5 weight percent to about 5 weight percent of the outer layer.

15. The image forming apparatus of claim 10, wherein the static dissipative outer surface of the pressure roller comprises conductive particles dispersed in a fluoropolymer.

16. The image forming apparatus of claim 15, wherein the fluoropolymer of the static dissipative outer surface of the pressure roller comprises a fluoroplastic selected from the group consisting of polytetrafluoroethylene (PTFE); perfluoroalkoxy polymer resin (PFA); copolymer of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), and hexafluoropropylene (HFP).

17. The image forming apparatus of claim 10, wherein the static dissipative outer surface of the pressure roller comprises a metal selected from the group consisting of silver, aluminum, nickel.

18. A fuser system comprising:

a fuser roller comprising a release layer comprising carbon nanotubes dispersed in a fluoropolymer wherein the carbon nanotubes comprise from about 0.1 weight percent to about 10 weight percent of the outer layer;

an oil delivery roller for delivering oil to the release layer of the fuser roller wherein the delivery roller comprises a static dissipative outer surface having a surface resistivity of less than about $10^6$ Ω/cm; and a pressure roller wherein the fuser roller and the pressure roller create a nip, the pressure roller comprising a static dissipative outer surface having a surface resistivity of less than about $10^6$ Ω/cm.

19. The fuser system of claim 18, wherein the carbon nanotubes of the outer layer of the fuser roller comprise from about 0.5 weight percent to about 5 weight percent of the outer layer.

* * * * *